3,574,753
PREPARATION OF ALLYL DIFLUOROAMINE
Richard P. Rhodes, Newark, and Anthony J. Passannante, Metuchen, N.J., assignors to Esso Research and Engineering Company
No Drawing. Filed May 11, 1960, Ser. No. 28,494
Int. Cl. C07c 85/00, 87/26
U.S. Cl. 260—583                    1 Claim

ABSTRACT OF THE DISCLOSURE

Allyl difluoroamine is selectively prepared by reacting propylene with tetrafluorohydrazine in the gas phase at elevated temperatures, preferably at a temperature in the range of from about 250° to about 380° C. The allyl difluoroamine compounds prepared in accordance with the instant process are excellent oxidizing agents for fuels used in rocket propellants.

---

The present invention relates to the preparation of low molecular weight difluoroamine compounds. Specifically it concerns reacting tetrafluorohydrazine with propylene at elevated temperatures to make oxidizers, such as allyl difluoroamine and 1,2,3-tris (difluoroamino) propane.

Heretofore it has been disclosed that allyl difluoroamine can be prepared from allyl halides, e.g. allyl bromide, and tetrafluorohydrazine. It was thought that it was necessary to have an easily replaceable halogen atom attached to the "3" position in propylene in order to make allyl difluoroamine and the above-mentioned "tris" compound, otherwise the difluoroamine groups would add only to the double bond and compounds such as 1,2-bis (difluoroamino) propane would be obtained.

It has been found that allyl difluoroamine and 1,2,3-tris (difluoroamino) propane can be made from propylene and a difluoroamine reactant, i.e. tetrafluorohydrazine by contacting the reactants in the gas phase at high temperatures, i.e. ca. 150° to 400° C., for from a few seconds to several hours.

Pressure is not a critical condition. Atmospheric pressure is generally suitable, although absolute pressures as low as 100 mm. and as high as 5 to 40 atmospheres may also be employed. High $N_2F_4$ pressures may be employed to reduce the reaction time and improve the yield of the "tris" product. The temperature of the reaction zone should be maintained at a sufficiently elevated level to promote a rapid reaction. While the above-mentioned temperature range is satisfactory, i.e. at least about 150° C., optimum yields and reaction rates are obtained when the reaction is carried out for about 0.5 to 2 or even 5 minutes at temperatures of 250° to 380° C., e.g. 350° C.

The propylene used should be essentially free of any interfering substances. It will be found that propylene that is at least 99% pure will be suitable for the process. The tetrafluorohydrazine should also be pure, that is to say it must be at least 95% pure.

In carrying out the present invention, tetrafluorohydrazine gas and propylene gas are separately fed into the reaction zone which is under atmopsheric pressure in a molar ratio of 0.1 to 10:1, preferably 0.5 to 4:1, and allowed to remain in contact with each other at 250° to 380° C. for about 1 to 2 minutes. The unreacted chemicals and their reaction products are withdrawn from the reaction zone and the heavier products are separated by conventional techniques. For instance, the products may be condensed in a cold trap that is kept below the boiling point of the liquid products, e.g. below about 0° C. The allyl difluoroamine and 1,2,3-tris(difluoroamino) propane may be recovered from the reactor effluent by means of a Dry Ice or wet ice condenser. Any unreacted propylene or tetrafluorohydrazine may be recycled to the reaction zone.

The use of a gas diluent, such as dry nitrogen or helium, is optional. If a diluent is employed, only small amounts are necessary, e.g. 1 to 10 moles of diluent per mole of propylene.

The reaction, which may be carried out either batchwise or continuously, does not require the use of any expensive or unusual equipment. The reaction zone may comprise a long steel tube through which the reactant gases are continuously flowed at a slow rate. The products in the exit gas are easily separated from the unreacted chemicals by merely cooling the stream to a temperature of about −20 to 0° C. Both the "tris" compound and the allyl difluoroamine have boiling points well above room temperature, i.e. 127° and 41° C., respectively, and therefore readily condense at the aforementioned temperature range.

The difluoramino compounds prepared in accordance with the present invention are excellent oxidizing agents for fuels, e.g., boron, used in pure rocket propellants. A suitable rocket propellant utilizing the "tris" compound is as follows:

| Component: | Wt. percent |
|---|---|
| 1,2,3-tris (difluoroamino) propane | 48.0 |
| Tetranitromethane | 39.4 |
| Boron | 2.6 |
| Rubber binder | 10.0 |

This propellant composition has a calculated specific impulse of 282 sec.$^{-1}$.

They also serve as intermediates in the preparation of nitriles, amines, and other nitrogen-containing compounds of known utility. Because of their explosive nature, the "tris" compounds are also useful as detonators.

The following examples are given to permit a better understanding of the novel process:

EXAMPLE 1

Pure propylene and tetrafluorohydrazine were separately charged to an electrically heated stainless steel tube having a ¼" inside diameter in a molar ratio of 1.8:1. The gas reactants were permitted to flow slowly through the tube (about 1 minutes residence time), which was 25 feet long and maintained at a temperature of 250° C. and atmospheric pressure. Connected to the exit end of the tubular reactor was a recovery tube which passed through a wet ice-salt trap that was at about −10° C. The unreacted gas reactants can be recycled to the tubular reactor, if desired. The liquid product in the ice trap was analyzed in a gas chromatograph apparatus in which the substrate was silicone oil on firebrick. The lower boiling allyl difluoroamine product (B.P. 41° C.) was separated from the "tris" product by simple distillation. The yields of allyl difluoroamine and 1,2-bis (difluoroamino) propane were 13 wt. percent and 77 wt. percent, respectively, on the propylene reactant. The yield of 1,2,3-tris (difluoroamino) propane was less than 1 wt. percent.

The allyl difluoroamine recovered is easily converted to "tris" by reacting it with 1 atmosphere of $N_2F_4$ at about 150 to 200° C., e.g. 170° C., for about an hour in a stainless steel reactor, e.g. bomb or tubular reactor. The yield of "tris" is substantially quantitative.

EXAMPLE 2

When the process described in Example 1 was repeated at a temperature of 375° C., the yield of allyl difluoroamine product was 20 wt. percent based on propylene. The yield of allyl difluoroamine appears to be a function of temperature, with the yield improving as the temperature increases up to the decomposition temperature of the products.

EXAMPLE 3

Larger yields of "tris" can be made by reacting propylene with 30 atmospheres of $N_2F_4$ at 200° to 250° C. for 10 to 30 minutes or more. However, this process presents separation difficulties because the 1,2-bis (difluoroamino) propane has a boiling point that is close to that of the "tris" compound. They can be separated in an efficient fractionation column.

It is not intended to restrict the present invention to the foregoing examples which are merely given to demonstrate some of the embodiments of the invention. It should only be limited to the appended claim in which it is intended to claim all of the novelty inherent in the invention as well as the modifications and equivalents coming within the scope and spirit of the invention.

What is claimed is:

1. Process for making allyl difluoroamine which comprises reacting propylene gas with tetrafluorohydrazine gas in a molar ratio of 1:0.5 at about 250 to 380° C. and approximately atmospheric pressure for about a minute in a reaction zone, withdrawing the reaction mixture from said reaction zone, condensing the allyl difluoroamine and other liquid difluoroamino-containing compounds from the reaction mixture and distilling the condensate to recover allyl difluoroamine.

No references cited.

CHARLES B. PARKER, Primary Examiner

R. L. RAYMOND, Assistant Examiner

U.S. Cl. X.R.

149—109